Feb. 23, 1932.    F. HODGKINSON    1,846,598
FLUID SEAL PACKING GLAND
Filed April 26, 1930    2 Sheets-Sheet 1

INVENTOR
Francis Hodgkinson.
BY
ATTORNEY

Feb. 23, 1932.   F. HODGKINSON   1,846,598
FLUID SEAL PACKING GLAND
Filed April 26, 1930   2 Sheets-Sheet 2

WITNESSES:

INVENTOR
Francis Hodgkinson.
BY
ATTORNEY

Patented Feb. 23, 1932

1,846,598

UNITED STATES PATENT OFFICE

FRANCIS HODGKINSON, OF PHILADELPHIA, PENNSYLVANIA, ASSIGNOR TO WESTINGHOUSE ELECTRIC & MANUFACTURING COMPANY, A CORPORATION OF PENNSYLVANIA

FLUID SEAL PACKING GLAND

Application filed April 26, 1930. Serial No. 447,633.

My invention relates to glands of the water, or liquid-sealing type.

Glands of the water-sealed type having annular chambers for water seals maintained by centrifugal-like runners are well known, are quite widely used in connection with steam turbines, and are effective as sealing means; however, with the existing tendency to higher turbine speeds, the gland runners secured to the turbine shaft or spindle must, of course, have higher surface speeds and this introduces losses. Furthermore, because of high speed, there is a tendency for the water, or sealing liquid, to be broken up to such an extent as to permit infiltration of air through the gland.

Accordingly, therefore, it is an object of my invention to provide a gland construction for use with high-speed machinery and which will not be subject to the objections pointed out on account of excessive speed.

A further object of my invention is to provide a gland of the general type referred to including a housing having side walls through which extends the shaft or spindle to be packed together with ring-like members having bearing relation with respect to the shaft or spindle and pressed outwardly into contact with the walls to provide for sealing.

A further object of my invention is to provide packing for a shaft or spindle including rings made up of segments or sections and held together by detachable fastening means, the rings having bearing relation with respect to the shaft or spindle and being pressed out in sealing relation with respect to suitable wall surfaces.

A further object of my invention is to provide a packing gland for a shaft or spindle including a self-aligning ring element having bearing relation with respect to the shaft or spindle packing against a suitable wall or surface.

A further object of my invention is to provide a gland for a shaft or spindle which passes through a suitable housing to which suitable sealing liquid is admitted, the gland consisting of ring elements having bearing relation with respect to the shaft or spindle and being pressed out in sealing relation with respect to the chamber walls by a spring, the rings being modified to provide for the reception of sealing liquid in the bearing portions thereof to lubricate the latter.

These and other objects are effected by my invention as will be apparent from the following description and claims taken in connection with the accompanying drawings, forming a part of this application, in which:

Figures 1, 2, 3, 4:
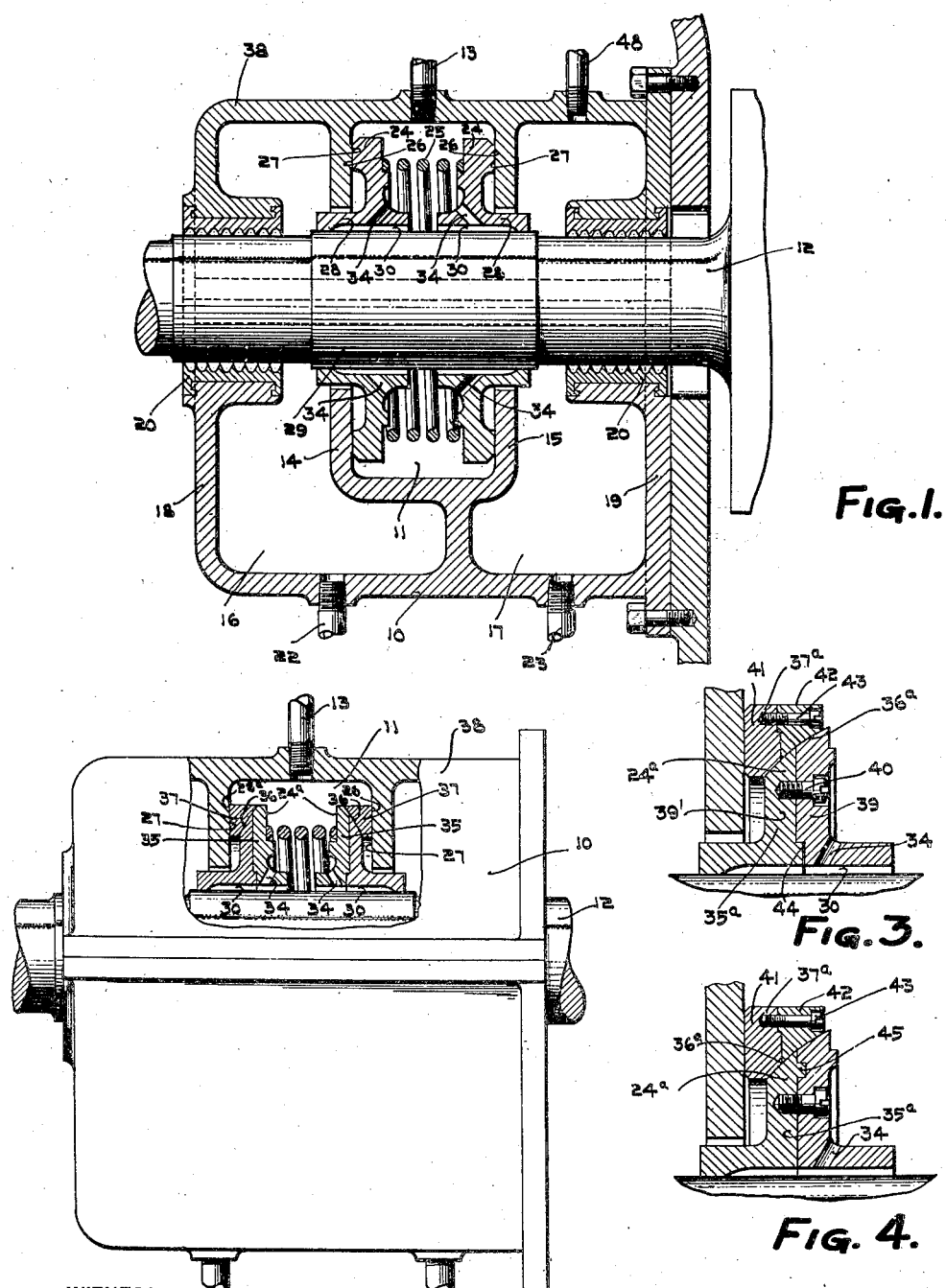
Fig. 1 is a vertical sectional view of my improved gland.
Fig. 2 is a view in side elevation of the apparatus shown in Fig. 1 with a portion in section to show a modified feature of the ring construction.
Figs. 3 and 4 are detail views showing different forms of ring construction.
Figure 5:
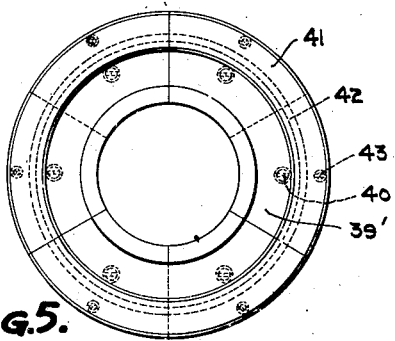
Fig. 5 is a detail view of one of the assembled ring constructions.
Figure 6:
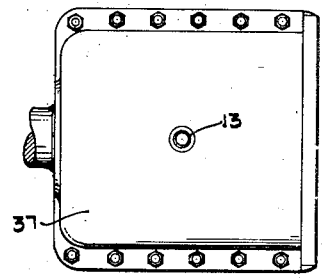
Fig. 6 is a plan view of a gland such as shown in Figs. 1 and 2.

Referring now to the drawings more in detail, I show a housing 10 provided with a pressure chamber 11 disposed about a suitable shaft or spindle 12, for example, a turbine spindle, and arranged to have sealing liquid supplied thereto by a conduit or passage 13.

The housing 10 embodies wall members or partitions 14 and 15 which cooperate to define the inlet or pressure chamber 11 and which separate the latter from drainage chambers 16 and 17 arranged between the partitions or wall members 14 and 15 and outer wall members 18 and 19. Suitable dirt excluding elements or guards 20, 20 are arranged between the end wall members 18 and 19 and the spindle 12. Drainage connections 22 and 23 are associated with the drainage chambers 16 and 17, respectively. Water, or other suitable liquid, is admitted by the conduit or passage 13 to the chamber 11 under a moderate pressure, that is, a pressure somewhat superior to that against which the packing is to pack.

The packing includes a pair of ring elements 24, 24 spread apart by a spring 25 so that outer lateral sealing portions 26, 26 engage the opposed surfaces 27, 27 of the chamber 11. The portions 26, 26 are preferably ground to provide, with the surfaces 27, 27 fits minimizing the leakage of liquid therebetween. The sealing liquid cooperates with the closely fitting ring element and wall member surfaces to provide for effective sealing. The ring elements are provided with hubs 28, 28 having bearing relation with respect to the shaft or spindle 12, the latter preferably having a sheath 29 of non-corrosive material providing a journal portion for the hub portions.

The bearing surfaces between the shaft or spindle and the hub portions are lubricated by the sealing liquid, and the hub portions are formed with suitable passages to supply sealing liquid in such quantity and in such a manner as to secure adequate lubrication with low viscosity liquid. The hub portions 28, 28 are provided with admission passages 30 and with alternately arranged discharge passages 31. The passages 30 have their inner ends preferably opening into the chamber 11 and their outer ends closed; and the discharge passages 31 have their inner ends closed and their outer ends opening into the lateral drainage chambers 16 and 17.

Sealing liquid entering a passage 30 adheres to the shaft or spindle and it is carried thereby to the succeeding discharge passage 31, where the major portion of such liquid is discharged, the liquid so passing from an admission passage to a discharge passage serving as a lubricating medium.

Figure 7:
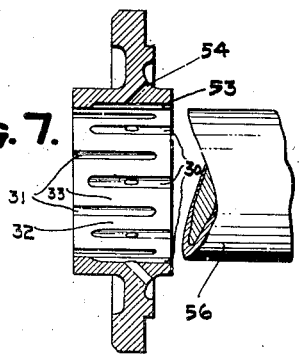
Fig. 7 is a sectional, detail, exploded view showing the bearing relation of a ring construction with respect to the spindle.
Figure 8:
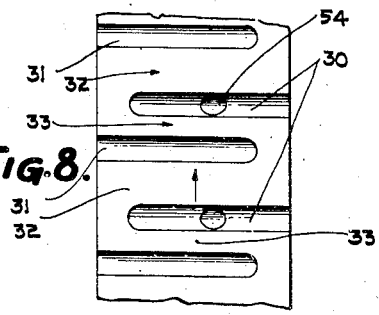
Fig. 8 is a fragmentary view of the interior bearing surface of one of the ring constructions.

Pairs of cooperating passages 30 and 31 are shown in Figs. 7 and 8, the passages of each pair being separated by lubricated bearing portions 32 of the hubs and the pairs are separated by bearing portions 33, which are, as shown in Fig. 8, preferably made circumferentially as short as possible on account of relatively poor lubrication between adjacent pairs. In Fig. 8, the arrows indicate the direction of motion of the shaft or journal as well as that of liquid adhering thereto in the passages 30 of the pairs and discharged in the passages 31 thereof. The hubs may be provided with a suitable number of pairs of passages to provide for lubrication even though the viscosity may be low.

To overcome the centrifugal tendency of the spindle or shaft 12 preventing proper entrance of liquid into the admission passages 30, I provide ports or passages 34 extending through the hubs for supplying liquid from the chamber 11 to the admission passages 30.

The ring constructions may be made self-aligning. Hence, in Fig. 2, I show ring constructions, or elements, 24a, 24a consisting of inner parts 35, 35 having universal or self-aligning connections 36, 36 with respect to outer ring parts 37, 37 having sealing portions 26a, 26a with respect to the inner surfaces 27, 27.

The housing 10 is preferably provided with a removable cover 38 to permit of the apparatus being assembled and dismantled. Where the shaft or spindle 12 has an obstruction, such as a coupling head, which would interfere with the passage of the ring constructions thereover, such ring constructions may be made up of segments. In Figs. 3 and 4, I show ring constructions made up of inner and overlapping segments 39 and 39' connected by screws 40 and outer overlapping segments 41 and 42 connected by screws 43. The connected segment 39 and 39' constitute inner ring parts 35a, 35a having universal or self-aligning connections 36a, 36a, with respect to outer ring parts 37a, 37a comprised by the segments 41 and 42. In Fig. 3, alignment of the segments 39 and 39' is assured by the spigot connections 44, and, in Fig. 4, the same result is achieved by the cooperating tongue and groove connection 45.

Figures 9, 10:
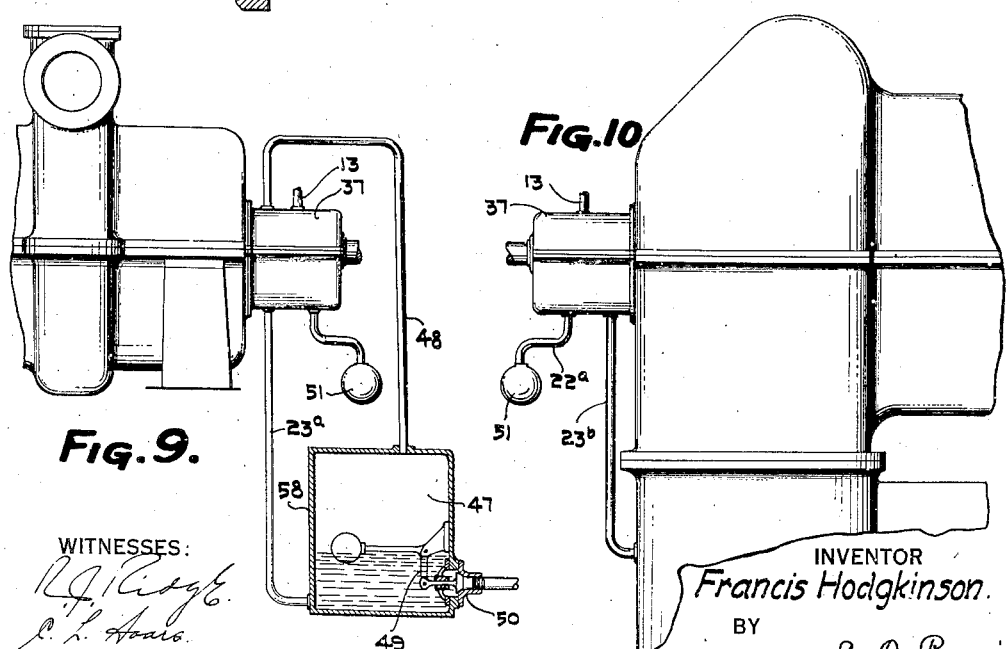
Fig. 9 is a detail view showing my improved gland applied to the high-pressure end of a turbine or other machine in which the internal pressure is above atmospheric; and, Fig. 10 is a view, similar to Fig. 9, but showing my improved gland applied to the low-pressure end of a turbine or other machine where the internal pressure is below atmospheric.

The packing may be used to pack against any suitable pressure. In Fig. 9, I show the packing associated with the high-pressure end of a turbine. Sealing liquid under pressure superior to that at the high-pressure end of the turbine enters the chamber 11 through the passage 13. The drainage chamber 17 adjacent to the high-pressure end of a turbine has its drainage connections 23a connected to a suitable hydrostatic seal in order to maintain the turbine and atmospheric pressure difference. In this view, for example, the connection 23a is shown discharging into the chamber 47 having a vent 48 leading to the top of the central chamber 11 and provided with a float-controlled valve 49 for the outlet 50, the valve 49 opening upon the attainment of a predetermined level to permit of the escape of liquid. The outer drainage chamber 16 of the packing is connected to a suitable tank 51.

In Fig. 10, the packing is associated with the low-pressure end of the turbine; and liquid enters the chamber 11 at a pressure somewhat above atmospheric in that the packing must pack against atmospheric pressure. In Fig. 10, the inner drainage chamber 17 is connected to the condenser and the outer drainage chamber 16 is connected to a suitable tank 51, as in Fig. 9.

In operation, sealing liquid under moderate pressure is admitted to the chamber 11 and such liquid seals between the outer lateral annular portions of the ring constructions and the central chamber end walls, and the sealing liquid is also admitted copiously to the bearing portions of the hubs to lubricate the latter, the ring constructions being maintained in relatively close contact with respect to the chamber end walls by means of the spring 25. Effective lubrication of the spindle and hub bearing surfaces is provided for, even though the liquid is of low viscosity, by pairs of cooperating admission and discharge passages 30 and 31, the pairs being arranged as close together as possible so as to provide the maximum extent of lubricated surface. Liquid is admitted to the chamber 11 at a moderate pressure, that is, a pressure somewhat superior to that packed against.

From the foregoing, it will be apparent that I have devised a gland of the liquid-sealing type which may be used for a high-speed turbine without excessive friction and without undue breaking up of the sealing liquid. Friction is minimized by utilizing the sealing liquid as a lubricating medium and breaking up of the sealing liquid is reduced in that it is not subjected to severe rotary effects or agitation.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. The combination with a turbine spindle, of a gland therefor including an intermediate chamber separated from laterally-disposed drainage chambers by opposed walls having openings through which the spindle passes; rings disposed in the central chamber, having hub bearing portions fitting the spindle, and having lateral portions packing against said intermediate chamber walls; a spring for pressing the rings toward said walls; means providing for the admission of liquid to said intermediate chamber; and a plurality of pairs of admission and discharge grooves intersecting the bearing surfaces of said hub portions, the admission grooves communicating with said intermediate chamber and the discharge grooves communicating with said drainage chambers.

2. The combination with a turbine spindle, of a gland therefor including an intermediate chamber separated from laterally-disposed drainage chambers by opposed walls having openings through which the spindle passes; rings disposed in the central chamber, having hub bearing portions fitting the spindle, and having lateral portions packing against said walls; a spring for pressing the rings toward said walls; means providing for the admission of liquid to said intermediate chamber; a plurality of pairs of admission and discharge grooves formed in the hub portions and intersecting the bearing surfaces thereof, the admission grooves being in communication with the intermediate chamber and the discharge grooves being in communication with the laterally-disposed drainage chambers and the circumferential distance between an admission groove and the discharge groove of a pair being greater than the circumferential distance between adjacent pairs of grooves.

3. The combination with a turbine spindle, of a gland therefor including an intermediate chamber separated from laterally-disposed drainage chambers by opposed walls having openings through which the spindle passes; rings disposed in the central chamber, having hub bearing portions fitting the spindle, and having lateral portions packing against said intermediate chamber walls; a spring for pressing the rings toward said walls; means providing for the admission of liquid to said intermediate chamber; a plurality of pairs of admission and discharge grooves formed in each hub portion and intersecting the bearing surface thereof with the admission grooves opening into the intermediate chamber and the discharge grooves opening into a drainage chamber; and supply passages extending through the hub portions so as to afford communication between the interior of said chamber and said admission grooves.

4. The combination with a turbine spindle, of a gland therefor including a chamber provided with opposed walls having openings through which the spindle passes; ring constructions having hub bearing portions fitting the spindle and having self-aligning outer annular portions packing laterally against said chamber walls; spring means for pressing the ring constructions toward the chamber walls; means providing for the admission of liquid to said chamber; a plurality of grooves extending longitudinally of the hub portions and intersecting the interior bearing surfaces thereof with their inner ends opening into said chamber; and passages communicating with the respective grooves and extending through the hub portions to provide for the admission of liquid to the grooves from regions of the chamber substantially unaffected by centrifugal effects of the spindle.

5. The combination with a turbine spindle, of a gland therefor including a chamber for liquid under pressure separated from lateral chambers by opposed walls having openings through which the spindle passes; ring constructions having hub bearing portions fitting the spindle and having self-aligning outer annular portions packing against said chamber walls; a spring for pressing the ring constructions toward the walls; means providing for the admission of liquid under suitable pressure to said pressure chamber; pairs of admission and discharge grooves extending longitudinally of the hub portions and intersecting the bearing surfaces thereof, the admission grooves opening into the pressure chamber and the discharge grooves opening into the drainage chambers and the circumferential distance between the passages of each pair being greater than the circumferential distance between adjacent pairs of passages; and ports extending through the hub portions for supplying liquid from regions of said pressure chamber, substantially unaffected by centrifugal effects of the spindle, to said admission grooves.

In testimony whereof, I have hereunto subscribed my name this 15th day of April, 1930.

FRANCIS HODGKINSON.